(12) United States Patent
Kolay et al.

(10) Patent No.: US 12,116,209 B2
(45) Date of Patent: Oct. 15, 2024

(54) CONVEYOR ROLLER INTEGRATED DIVERT MECHANISM

(71) Applicant: Intelligrated Headquarters, LLC, Mason, OH (US)

(72) Inventors: Abhishek Kolay, Howrah (IN); Ravi Kumar Avupati, Hyderabad (IN); Saravanan Sadasivan, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 29 days.

(21) Appl. No.: 17/812,544

(22) Filed: Jul. 14, 2022

(65) Prior Publication Data

US 2024/0017927 A1   Jan. 18, 2024

(51) Int. Cl.
*B65G 13/06*   (2006.01)
*B65G 43/00*   (2006.01)
*B65G 47/52*   (2006.01)

(52) U.S. Cl.
CPC ............ *B65G 13/06* (2013.01); *B65G 43/00* (2013.01); *B65G 47/52* (2013.01); *B65G 2203/0266* (2013.01)

(58) Field of Classification Search
USPC ...................................... 198/370.1
See application file for complete search history.

(56) References Cited

U.S. PATENT DOCUMENTS

| | | | |
|---|---|---|---|
| 3,370,685 A * | 2/1968 | Guilie ............ | B65G 13/10 193/36 |
| 3,552,541 A * | 1/1971 | Riggs ............ | B65G 13/10 198/525 |
| 3,964,588 A | 6/1976 | Kornylak | |
| 3,976,177 A | 8/1976 | Brown | |
| 4,018,322 A | 4/1977 | Brown et al. | |
| 4,372,435 A | 2/1983 | Bradbury | |
| 5,064,045 A | 11/1991 | Leon | |

(Continued)

FOREIGN PATENT DOCUMENTS

| | | |
|---|---|---|
| DE | 2854552 C2 | 2/1982 |
| DE | 4322114 A1 | 1/1994 |
| WO | 01/55012 A1 | 8/2001 |

OTHER PUBLICATIONS

Notice of Allowance and Fees Due (PTOL-85) Mailed on Jul. 31, 2023 for U.S. Appl. No. 17/811,915, 7 page(s).

(Continued)

*Primary Examiner* — William R Harp
(74) *Attorney, Agent, or Firm* — Alston & Bird LLP

(57) ABSTRACT

Apparatuses, methods and systems comprising conveyor roller integrated divert mechanisms are provided. The example conveyor roller integrated divert mechanisms are integrated with a motorized or non-motorized conveyor roller to controllably divert an item at any point along a conveyor line. An example conveyor roller includes a housing forming an at least partially hollow cylindrical tube. The housing includes a plurality of radial gaps. In addition, the conveyor roller includes a divert assembly at least partially disposed within the housing that is operable to divert an item. The divert assembly includes a retractable divert mechanism configured to controllably protrude from the housing through at least one of the plurality of radial gaps.

20 Claims, 12 Drawing Sheets

(56) References Cited

U.S. PATENT DOCUMENTS

| | | | |
|---|---|---|---|
| 5,333,722 | A | 8/1994 | Ouellette |
| 5,367,352 | A | 11/1994 | Schulz-Lekies |
| 5,934,441 | A | 8/1999 | Uchida et al. |
| 6,116,405 | A | 9/2000 | Gauchon |
| 7,431,148 | B2 | 10/2008 | Li et al. |
| 7,980,335 | B2 | 7/2011 | Potter |
| 9,988,218 | B2 | 6/2018 | Dugat et al. |
| 10,479,136 | B2 | 11/2019 | McKinnon |
| 11,247,849 | B2 | 2/2022 | Kuhn et al. |
| 11,654,714 | B2 | 5/2023 | Wang et al. |
| 11,845,613 | B1 | 12/2023 | Sadasivan et al. |
| 11,993,462 | B2 * | 5/2024 | Kolay .................. B65G 39/07 |

OTHER PUBLICATIONS

Non-Final Rejection Mailed on Jun. 15, 2023 for U.S. Appl. No. 17/811,915, 13 page(s).

"MODSORT® Divert & Transfer Module," Regal Rexnord, 1-8, (2002). [Retrieved from the Internet Jan. 10, 2023: <URL: https://www.regalrexnord.com/brands/System-Plast/Products/ModSort>].

Extended European Search Report Mailed on Jan. 15, 2024 for EP Application No. 23177591, 6 page(s).

Non-Final Rejection Mailed on May 15, 2024 for U.S. Appl. No. 18/498,407, 6 page(s).

Notice of Allowance and Fees Due (PTOL-85) Mailed on Jul. 24, 2024 for U.S. Appl. No. 18/498,407, 7 page(s).

\* cited by examiner

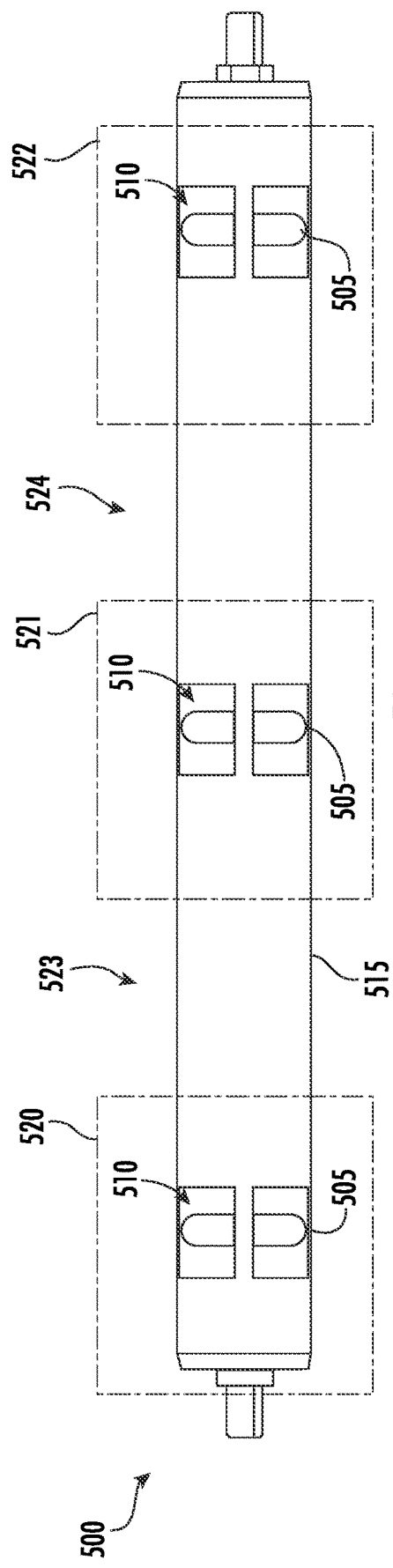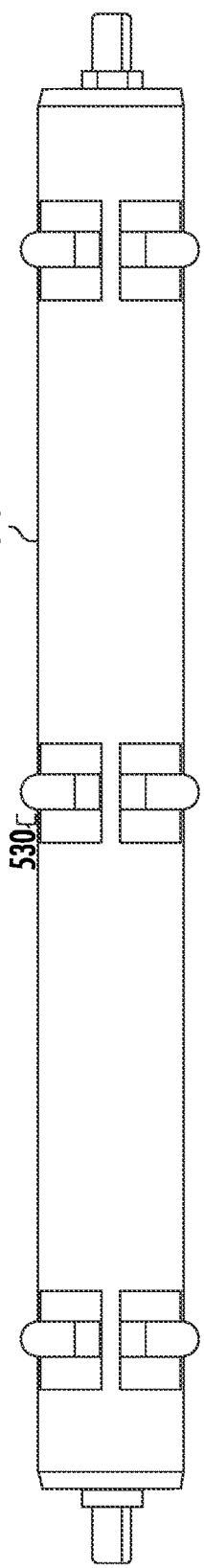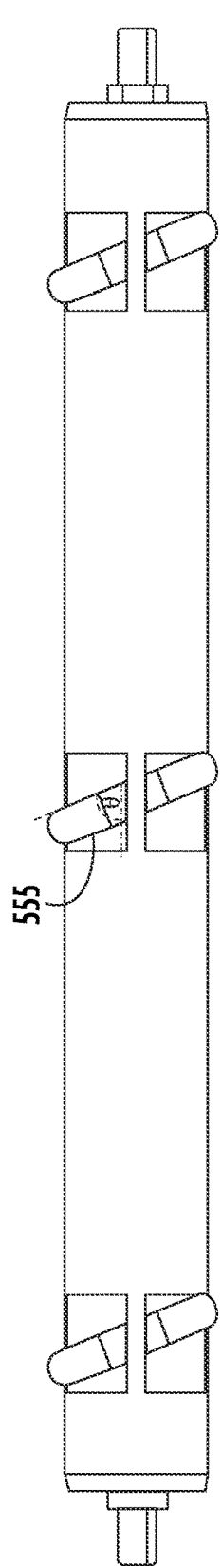

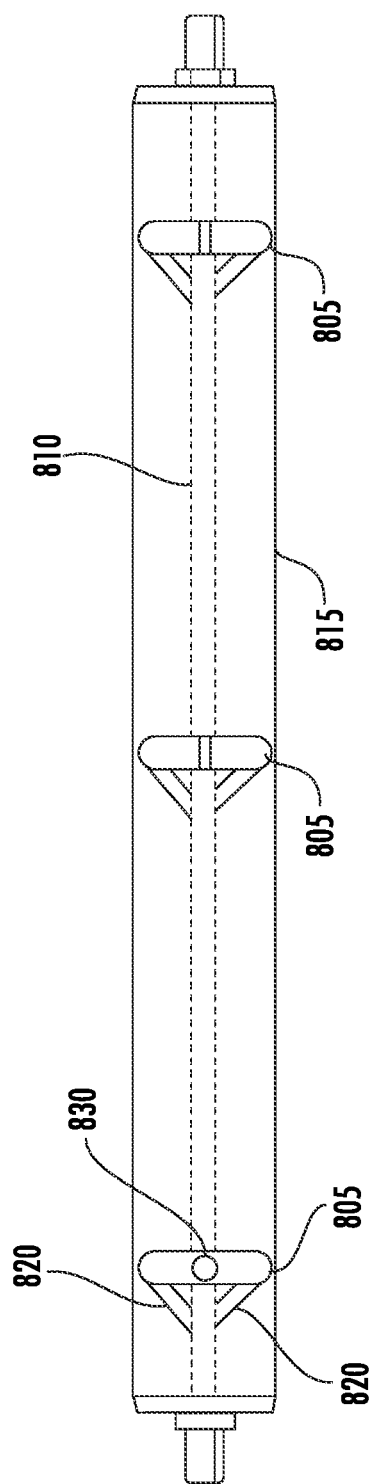
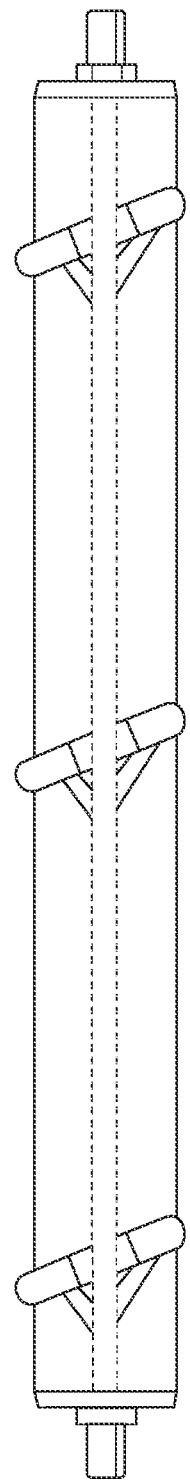

CONVEYOR ROLLER INTEGRATED DIVERT MECHANISM

BACKGROUND

The present disclosure relates in general to a conveyor rollers with in-built divert mechanisms for a conveyor system. Many rotating apparatuses and devices for conveyor systems are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems comprising reconfigurable motorized conveyor rollers.

In accordance with various examples of the present disclosure, a conveyor roller is provided. The conveyor roller comprises a housing forming an at least partially hollow cylindrical tube and a divert assembly at least partially disposed within the housing that is operable to divert an item. The housing comprises a plurality of radial gaps. The divert assembly comprises a retractable divert mechanism configured to controllably protrude from the housing through at least one of the plurality of radial gaps.

In some embodiments, the divert assembly further comprises an expansion mechanism attached to the retractable divert mechanism. The retractable divert mechanism is moveable to protrude from the housing at one or more different angles relative to the housing. The one or more different angles comprise at least (i) a first angle for diverting a time in a rightward direction with respect to the housing and (ii) a second angle for diverting the item in a leftward direction with respect to the housing.

In some embodiments, an angle of the retractable divert mechanism is controllable based on a desired divert angle for the item.

In some embodiments, the divert assembly further comprises an expansion mechanism attached to the retractable divert mechanism, the expansion mechanism operable to expand and retract the retractable divert mechanism through the at least one radial gap.

In some embodiments, the expansion mechanism comprises a cam slotted gear.

In some embodiments, the retractable divert mechanism is attached to a cam slot of the cam slotted gear.

In some embodiments, the expansion mechanism is configured to rotate to cause the retractable divert mechanism to expand or retract through the at least one radial gap.

In some embodiments, the conveyor roller comprises a motor assembly and a drive assembly at least partially disposed within the housing that are configured to cause rotation of at least a portion of the conveyor roller. The expansion mechanism is operatively coupled to the motor assembly. The motor assembly is configured to rotate the expansion mechanism to cause the retractable divert mechanism to expand or retract through the at least one radial gap.

In some embodiments, the conveyor roller comprises a controller component in electronic communication with the motor assembly, the drive assembly, and the divert assembly. The controller component is configured to cause a rotation the expansion mechanism responsive to an input.

In some embodiments, the conveyor roller comprises a center shaft disposed within the housing. The center shaft extends linearly along a center axis of the housing.

In some embodiments, the divert assembly is operably coupled to the center shaft.

In some embodiments, the divert assembly is operably coupled to the center shaft by a pivot joint.

In some embodiments, the divert assembly is configured to rotate with the center shaft. The center shaft is moveable in a lateral direction to adjust an angle of the retractable divert mechanism.

In some embodiments, the conveyor roller comprises a motor assembly and a drive assembly at least partially disposed within the housing that are configured to cause rotation of at least a portion of the conveyor roller. The center shaft is operatively coupled to the motor assembly. The motor assembly is configured to rotate the center shaft to cause a rotation of the housing.

In some embodiments, the motor assembly is configured to move the center shaft in the lateral direction to adjust the angle of the retractable divert mechanism.

In some embodiments, the conveyor roller comprises a controller component in electronic communication with the motor assembly, the drive assembly, and the divert assembly. The controller component is configured to cause a lateral movement of the center shaft responsive to an input.

In some embodiments, the divert assembly comprises a sensor configured to measure the angle of the retractable divert mechanism. The controller component is configured to receive configuration data from the divert assembly indicative of the angle of the retractable divert mechanism.

In accordance with various examples of the present disclosure, a method is provided. The method includes receiving, by a controller component of a conveyor roller, configuration data from a computing entity in electronic communication with the controller component, the configuration data indicative of diversion angle for the conveyor roller. The method comprises causing, by the controller component and based at least in part on the configuration data, a movement of the conveyor roller responsive to the configuration data. The movement comprises at least one of: (i) a lateral movement of a center shaft of the conveyor roller, or (ii) a rotation of at least a first portion of a divert assembly of the conveyor roller.

In some embodiments, the diversion angle indicates an angle to divert an item from a conveyor line associated with the conveyor roller. The movement comprises a lateral movement of the center shaft of the conveyor to adjust an angle of the divert assembly.

In some embodiments, the rotation of at least the first portion of the divert assembly causes a second portion of the divert assembly to expand through an exterior housing of the conveyor roller.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale, unless described otherwise. For example, the dimensions of some of the elements can be exaggerated relative to other elements, unless described otherwise. Embodiments incorporating teachings of the present disclosure are shown and described with respect to the figures presented herein, in which:

FIGS. 5A-C illustrate an example conveyor roller integrated divert mechanism in accordance with various embodiments of the present disclosure;

FIGS. 8A-B illustrate example side section views of an example conveyor roller in accordance with various embodiments of the present disclosure;

DETAILED DESCRIPTION OF THE INVENTION

Figure 1:
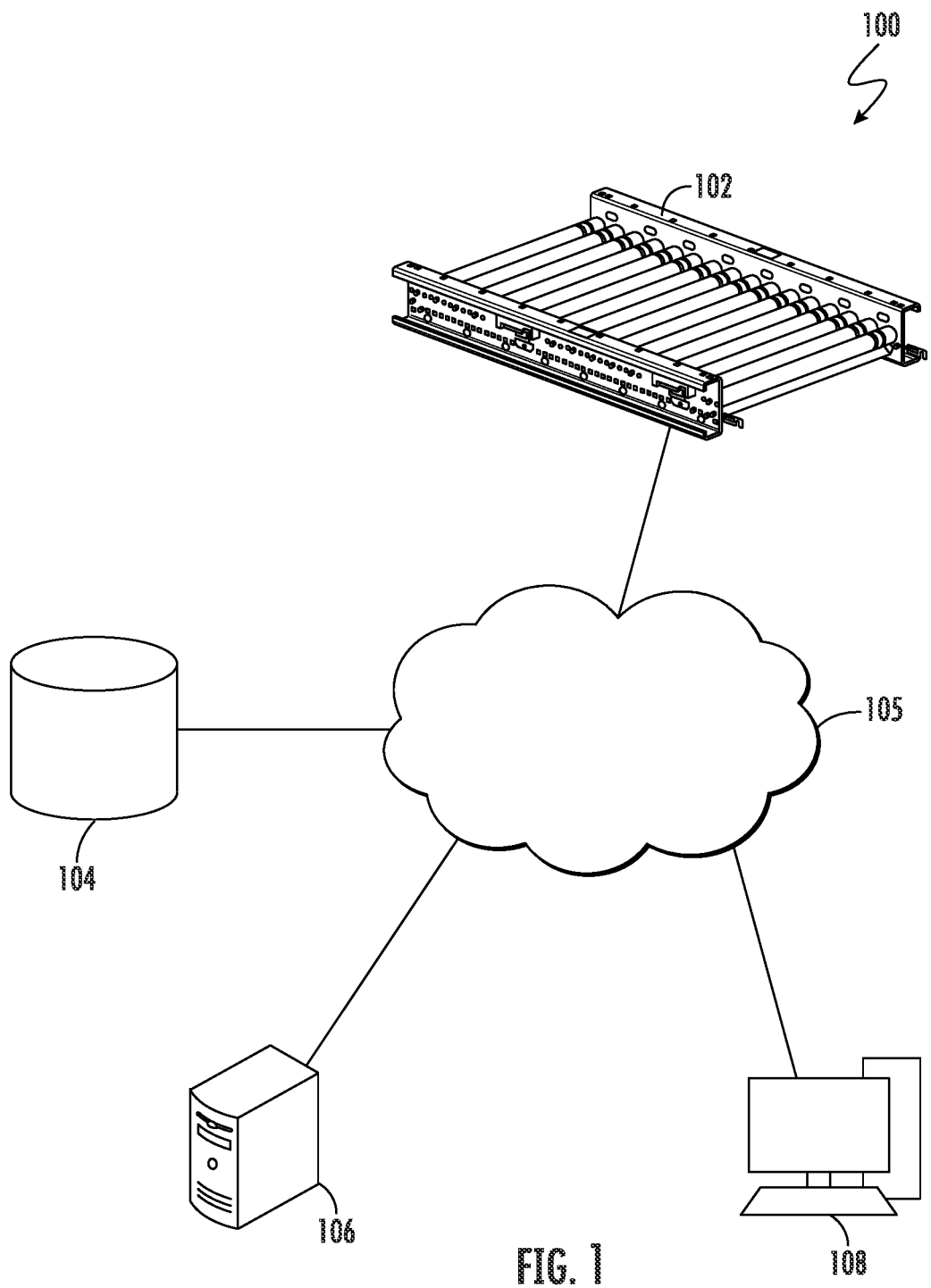
FIG. 1 illustrates an example of a system in accordance with various embodiments of the present disclosure.

Some embodiments of the present disclosure will now be described more fully hereinafter with reference to the accompanying drawings, in which some, but not all embodiments of the disclosure are shown. Indeed, these disclosures can be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that can or can not be present in various embodiments of the present disclosure described herein such that embodiments can include fewer or more components than those shown in the figures while not departing from the scope of the present disclosure. Some components can be omitted from one or more figures or shown in dashed line for visibility of the underlying components.

The phrases "in an example embodiment," "some embodiments," "various embodiments," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other embodiments.

If the specification states a component or feature "can," "can," "could," "should," "would," "preferably," "possibly," "typically," "optionally," "for example," "often," or "might" (or other such language) be included or have a characteristic, that a specific component or feature is not required to be included or to have the characteristic. Such components or features can be optionally included in some embodiments, or can be excluded.

The term "electronically coupled" or "in electronic communication with" in the present disclosure can refer to two or more electrical elements (for example, but not limited to, an example processing circuitry, communication element, input/output module memory) and/or electric circuit(s) being connected through wired means (for example but not limited to, conductive wires, system bus, wired Ethernet connection or traces) and/or wireless means (for example but not limited to, wireless network, electromagnetic field, Wi-Fi, Bluetooth, Zigbee), such that data and/or information (for example, electronic indications, signals) can be transmitted to and/or received from the electrical elements and/or electric circuit(s) that are electronically coupled.

The terms "conveyor," "conveyor section," "conveyor bed," "conveyor assembly" or "conveyor system," and similar terms are used interchangeably herein to refer to an apparatus that is configured to convey objects or articles within a material handling system in accordance with embodiments of the present disclosure. A motorized conveyor roller according to some embodiments discussed herein can comprise a plurality of drive components including a motor assembly and a drive assembly which operate to drive a housing (e.g., roller tube). These assemblies can have one or more components that are arranged in various configurations within an inner portion of the motorized conveyor roller. In some embodiments, the drive assembly can be fixed relative to the housing (e.g., roller tube), while the motor assembly is fixed relative to a frame supporting the roller tube, such that the motor assembly can be configured to rotate the drive assembly and roller tube.

In some embodiments, conveyor rollers can be utilized in conveyor lines to propel items along a path to multiple destinations. An item is diverted at a particular point along the path to help route the item to a particular destination. The item is diverted, for example, from the conveyor line (e.g., to another conveyor line, a sidetrack, a sorting area, etc.) or to another section of the conveyor line (e.g., through a 90 degree turn of the conveyor). Conveyor lines can be configured with distinct divert sections made up of a plurality of divert mechanisms to enable the diversion of items at particular points along a conveyor line. Such divert sections can include separate sections of the conveyor line that are integrated with the conveyor line between conventional conveyor rollers. Each divert section can include a different set of roller designs to divert items at specific angles and are in addition to the motor driven and non-motor driven rollers used elsewhere in the conveyor line. As a result, inventory and storage costs to the conveyor line are increased. Moreover, divert mechanisms can have size and shape constraints limiting their flexibility for setup anywhere in the conveyor line. At times, these divert mechanisms can lack various functionalities such as performing packet position control, transferring polybags, and correctly predicting angles for diverting the items on the conveyor line.

In accordance with various embodiments of the present disclosure, example methods, apparatuses, computer program products and systems are provided that, in some examples provide a conveyor roller integrated divert mechanism that can be integrated with motorized and/or non-motorized conveyor rollers of a conveyor line. The conveyor roller integrated divert mechanisms are controllably actuated to divert items on command at any point of the conveyor line.

For example, the present disclosure can provide a conveyor roller including a housing forming an at least partially hollow cylindrical tube. The housing includes a plurality of radial gaps. The conveyor roller includes a divert assembly at least partially disposed within the housing that is operable to divert an item. The divert assembly includes a retractable divert mechanism configured to controllably protrude from the housing through at least one of the plurality of radial gaps.

As such, the present disclosure provides a conveyor roller that includes an integrated divert mechanism for controllably diverting items at any point along a conveyor line. The flexible design can be utilized, in some examples, to dynamically divert items from any point along a conveyor line using one or more compatible conveyor rollers. In this manner, the conveyor rollers described herein can be configured to divert packages at desired angles on a conveyor line without additional divert mechanisms. Having a single, or multiple compatible, designs can increase the flexibility, lower the cost, and dimmish conveyor line setup restrictions of conventional conveyor rollers. The novel conveyor rollers described herein can be configured to perform packet position control, transfer polybags, and correctly predict angles for diverting items due to its various configurations enabled by the conveyor roller integrated divert mechanism.

Referring now to FIG. 1, a schematic diagram depicting an example system 100 in accordance various embodiments of the present disclosure is provided. As depicted, the example system 100 includes a conveyor 102 comprising one or more motorized conveyor rollers, one or more computing entities 106 (e.g., servers), one or more databases 104, one or more networks 105, one or more user computing entities 108, and/or the like. In various examples, the system 100 can operate to convey objects within a particular location or environment.

In various embodiments, the conveyor 102 can be configured to transport objects within a particular location or environment utilizing one or more motorized conveyor rollers. In some embodiments, the conveyor 102 includes one or more motorized conveyor rollers, the one or more computing entities 106, the one or more databases 104 and/or the one or more user computing entities 108 are in electronic communication with each other over the one or more networks 105 such that they can exchange data (e.g., receive and transmit data) with one another (e.g., periodically and/or in response to requests). Each of the components of the system 100 can be in communication with one another over the same or different wireless or wired networks 105 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, stand-alone devices, the various embodiments are not limited to this particular architecture.

As depicted in FIG. 1, the example system 100 includes one or more computing entities 106. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 106 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 106 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 106 with the assistance of the processing element and the operating system.

As indicated, in one embodiment, the computing entity 106 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 106 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 106 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 106 components can be located remotely from other computing entity 106 components, such as in a distributed system. Furthermore, one or more of the components can be aggregated and additional components performing functions described herein can be included in the computing entity 106. Thus, the computing entity 106 can be adapted to accommodate a variety of needs and circumstances, such as including various components described with regard to a mobile application executing on the user computing entity 108, including various input/output interfaces.

As depicted in FIG. 1, the system 100 includes a user computing entity 108. In various embodiments, the user computing entity 108 can be or include one or more mobile devices, wearable computing devices, and/or the like. An example user computing entity 108 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 108, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 108 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 108 can be capable of operating with one or more air interface standards, communication protocols, modulation types, and access types. More particularly, the user computing entity 108 can operate in accordance with any of a number of wireless communication standards and protocols. In a particular embodiment, the user computing entity 108 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 108 can communicate with various other devices using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 108 can also download changes, add-ons, and updates, for instance, to its firmware, software (e.g., including executable instructions, applications, program modules), and operating system.

According to one embodiment, the user computing entity 108 can include location determining aspects, devices, modules, functionalities, and/or similar words used herein interchangeably to acquire location information/data regularly, continuously, or in response to certain triggers.

The user computing entity 108 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 108 to cause display or audible presentation of information/data and for user interaction therewith via one or more user input interfaces. Moreover, the user interface can include or be in communication with any of a number of devices allowing the user computing entity 108 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 108 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 108 can capture, collect, store information/data, user interaction/input, and/or the like.

The user computing entity 108 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 108.

As depicted in FIG. 1, any two or more of the illustrative components of the system 100 of FIG. 1 can be configured to communicate with one another via one or more networks 105. The networks 105 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 105 can have any suitable communication range associated therewith and can include, for example, global networks (e.g., the Internet), MANs, WANs, LANs, or PANs. In addition, the networks 105 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 100, it is noted that the scope of the present disclosure is not limited to the example shown in FIG. 1. In some examples, the system 100 can include one or more additional and/or alternative elements, and/or can be different from that illustrated in FIG. 1.

Figure 2A:
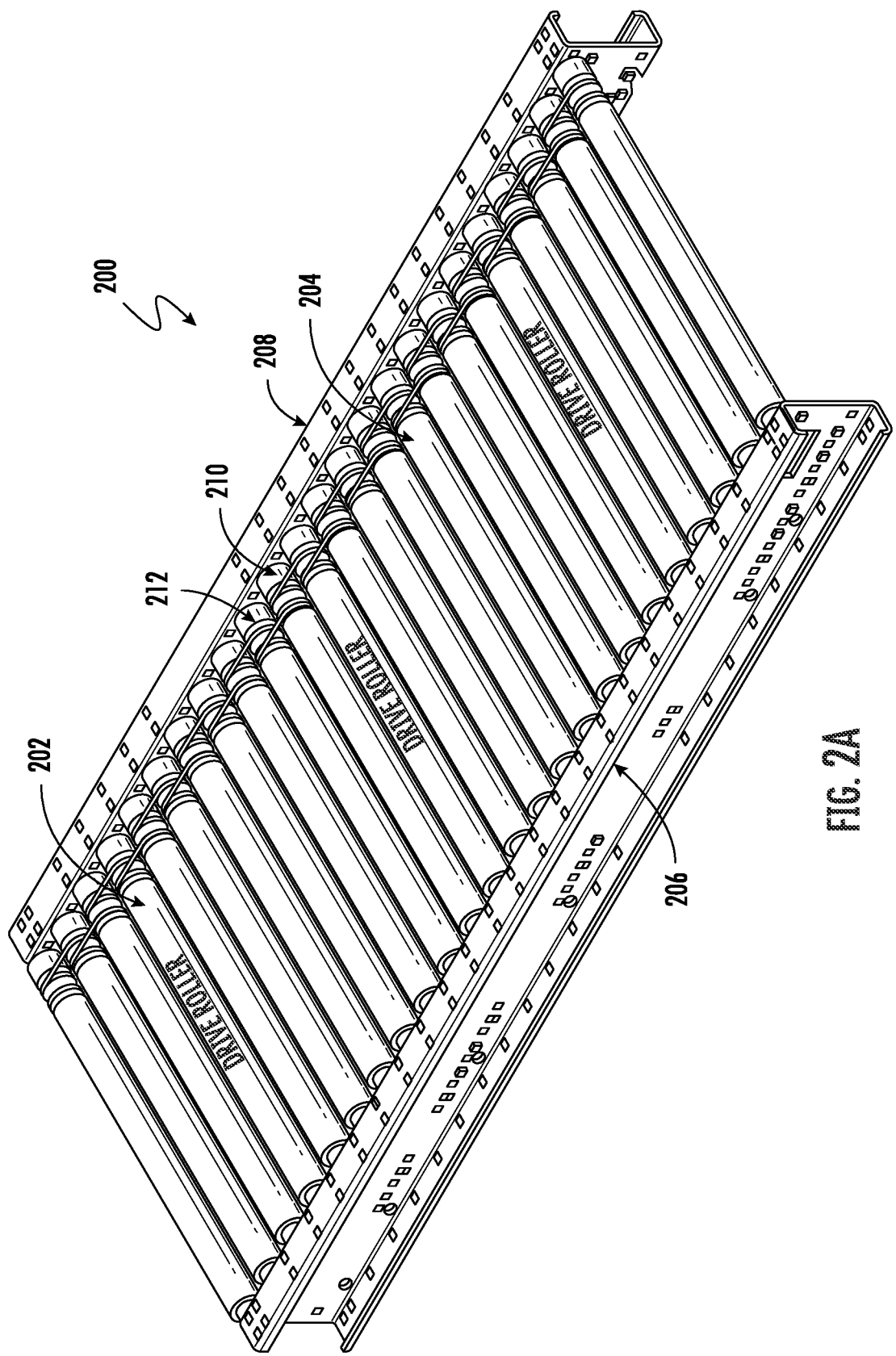
FIGS. 2A-B illustrate schematic diagrams of example distinct sections of conveyor lines with motorized and non-motorized rollers, in accordance with various embodiments of the present disclosure.
Figure 2B:
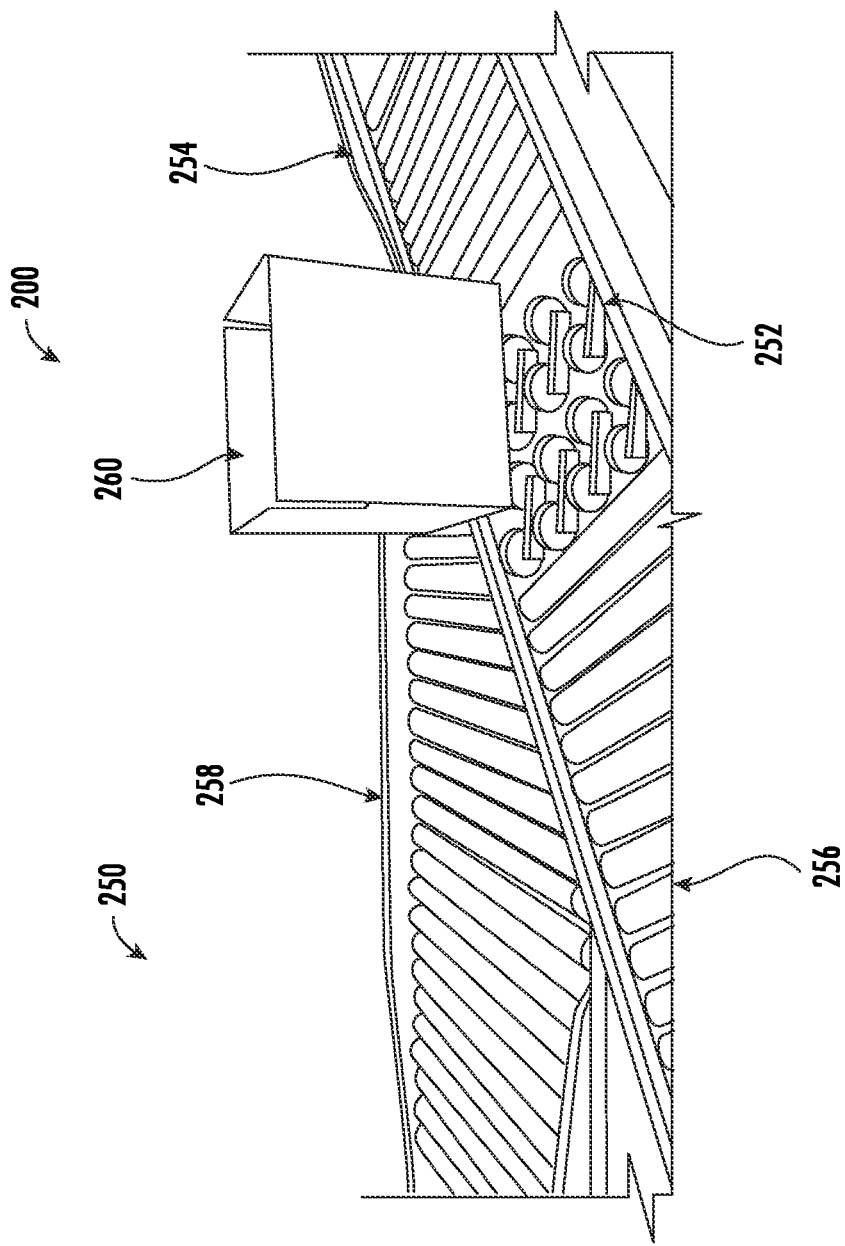

FIGS. 2A-B illustrate schematic diagrams of example distinct sections of conveyor lines with motorized and non-motorized rollers, in accordance with various embodiments of the present disclosure. FIG. 2A illustrates an example non-divert section 225 of a conveyor line 200 with motorized and non-motorized conveyor rollers in accordance with various embodiments of the present disclosure.

FIG. 2B illustrates an example divert section 250 of the conveyor line 200 with motorized and non-motorized conveyor rollers in accordance with various embodiments of the present disclosure.

As depicted in FIG. 2A, the example conveyor line 200 can include one or more motorized conveyor rollers, e.g., motorized conveyor roller 202, and one or more non-motorized conveyor rollers, e.g., non-motorized conveyor roller 204. In some embodiments, the conveyor line 200 can include at least a first rail 206 and a second rail 208. As depicted in FIG. 2A, the plurality of motorized conveyor rollers and non-motorized conveyor rollers (e.g., motorized conveyor roller 202 and non-motorized conveyor roller 204) are mechanically/operatively coupled to the first rail 206 and the second rail 208. In some embodiments, the first rail 206 and the second rail 208 can include one or more sets of apertures configured to receive the plurality of motorized conveyor rollers and non-motorized conveyor rollers (e.g., motorized conveyor roller 202 and non-motorized conveyor roller 204).

In some embodiments, as depicted in FIG. 2A, the non-motorized conveyor rollers (e.g., non-motorized conveyor roller 204) can be or include idler rollers or driven rollers. Additionally, the motorized conveyor rollers (e.g., motorized conveyor roller 202) can be or comprise drive rollers. In various embodiments, the motorized conveyor rollers/drive rollers are configured to drive the non-motorized conveyor rollers/idler rollers. For example, the motorized conveyor rollers/drive rollers can include drive bands, e.g., drive band 210. The example drive bands can comprise 0-drive bands to drive the non-motorized conveyor rollers/idler rollers. As depicted in FIG. 2, in some examples, the motorized conveyor rollers/drive rollers and the non-motorized conveyor roller/idler rollers are connected to each other through a series of drive bands, e.g, drive band 210, in order to drive the non-motorized conveyor rollers/idler rollers. As further depicted, each of the drive bands, e.g., drive band 210, is reeved around a tracking ring, e.g., tracking ring 212, provided on the motorized conveyor rollers/drive rollers and the non-motorized conveyor rollers/idler rollers. The example tracking ring 212 can operate to ensure that the drive band 210 does not slip out of the drive rollers and the idler rollers when operating at full speed. The example drive band 210 can be connected to idler pulleys provided on/attached to either the first rail 206 or the second rail 208 of the conveyor line 200 to maintain a target tension between the example drive band 210 and the motorized conveyor rollers/drive rollers and the non-motorized conveyor rollers/idler rollers (e.g., motorized conveyor roller 202 and non-motorized conveyor roller 204).

FIG. 2A is one example section of the conveyor line 200. Conventional conveyor lines can include a plurality of different sections, each including a plurality of motorized and/or non-motorized conveyor rollers. The example non-divert section 225 can be configured as a section of the conveyor line 200 in the which the first rail 206 and the second rail 208 include continuous, straight rails. The conveyor line 200 can include a plurality of different portions with one or more configurations.

FIG. 2B, for example, illustrates an example divert section 250 of the conveyor line 200. The example divert section 250 of the conveyor line 200 can include a diverting section 252 between three non-diverting sections 254, 256, and 258. The non-diverting sections 254, 256, and 258 can include one or more motorized and/or non-motorized conveyor rollers including similar dimensions, whereas the diverting section 252 can include a distinct set of divert rollers different from the motorized and non-motorized conveyor rollers. Unlike the conveyor rollers of the non-diverting sections 254, 256, and 258, the distinct set of divert rollers can be moved at one or more desired angles to divert an item 260 from a first section to another section of the conveyor line 200.

Accordingly, a plurality of different sets of rollers with multiple configurations can be used for the different sections in a divert section 250 of the conveyor line 200 to facilitate the desired movement of the item 260. This results in increased inventory and storage costs and limits the flexibility of conventional conveyor systems. Moreover, distinct diverting sections such as the diverting section 252 may lead to additional setup time and expertise. A conveyor roller integrated divert mechanism that can be integrated with the motorized and/or non-motorized conveyor rollers of the non-diverting sections 254, 256, and 258 of the conveyor line 200 is therefore advantageous.

Figure 3:
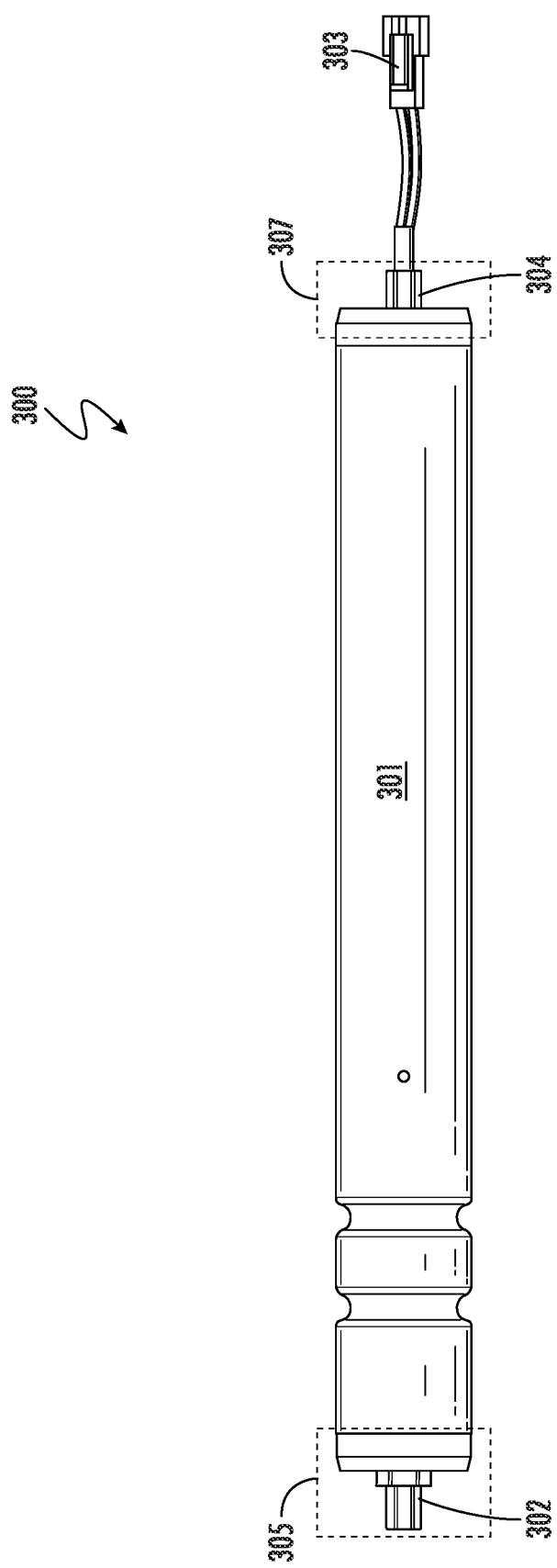
FIG. 3 illustrates an example integrated motorized conveyor roller in accordance with various embodiments of the present disclosure.

FIG. 3 is a schematic diagram depicting a perspective view of an example integrated motorized conveyor roller 300 in accordance with various embodiments of the present disclosure. In various embodiments, the example integrated motorized conveyor roller 300 can be part of a conveyor/conveyor system (e.g., the conveyor line 200 described above in connection with FIGS. 2A-B) and can be configured to drive one or more non-motorized conveyor rollers that are operatively coupled thereto. The conveyor/conveyor system can be part of an automated or semi-automated warehousing system in which objects can be stored, retrieved, conveyed, and/or the like in response to system instructions and/or user interactions via a computing entity (such as the user computing entity 108 described above in connection with FIG. 1). For example, the example integrated motorized conveyor roller 300 can be configured to convey objects along at least a portion of a conveyor line based at least in part on system instructions.

As depicted in FIG. 3, the example integrated motorized conveyor roller 300 comprises a housing 301 (e.g., roller tube) configured to contain one or more components/elements of the integrated motorized conveyor roller 300 (e.g., a controller component, as discussed in further detail below). In some examples, the housing 301 (e.g., roller tube) of the integrated motorized conveyor roller 300 comprises a hollow cylindrical body and can comprise metal, plastic, combinations thereof, and/or the like. As discussed herein, the cylindrical body can include an expandable body.

As further illustrated in FIG. 3, the example integrated motorized conveyor roller 300 comprises a first end cap 305 defining a first end/surface of the example integrated motorized conveyor roller 300. As depicted, the first end cap 305 comprises a first appendage 302 configured to be operatively coupled to a conveyor (e.g., disposed between a first rail and a second rail, such as within an aperture of the first rail).

Additionally, as depicted, the example integrated motorized conveyor roller 300 comprises a second end cap 307 defining a second end/surface of the example integrated motorized conveyor roller 300. As depicted, the second end cap 307 comprises a second appendage 304 configured to be operatively coupled to a conveyor (e.g., disposed between a first rail and a second rail, such as within an aperture of the second rail). As further depicted in FIG. 3, the integrated motorized conveyor roller 300 comprises a power cable 303 disposed adjacent the second end cap 307 that is configured to be connected to a power supply. Additionally, and/or alternatively, the power cable 303 can also be configured to provide a connection for data transfer.

Figure 4:
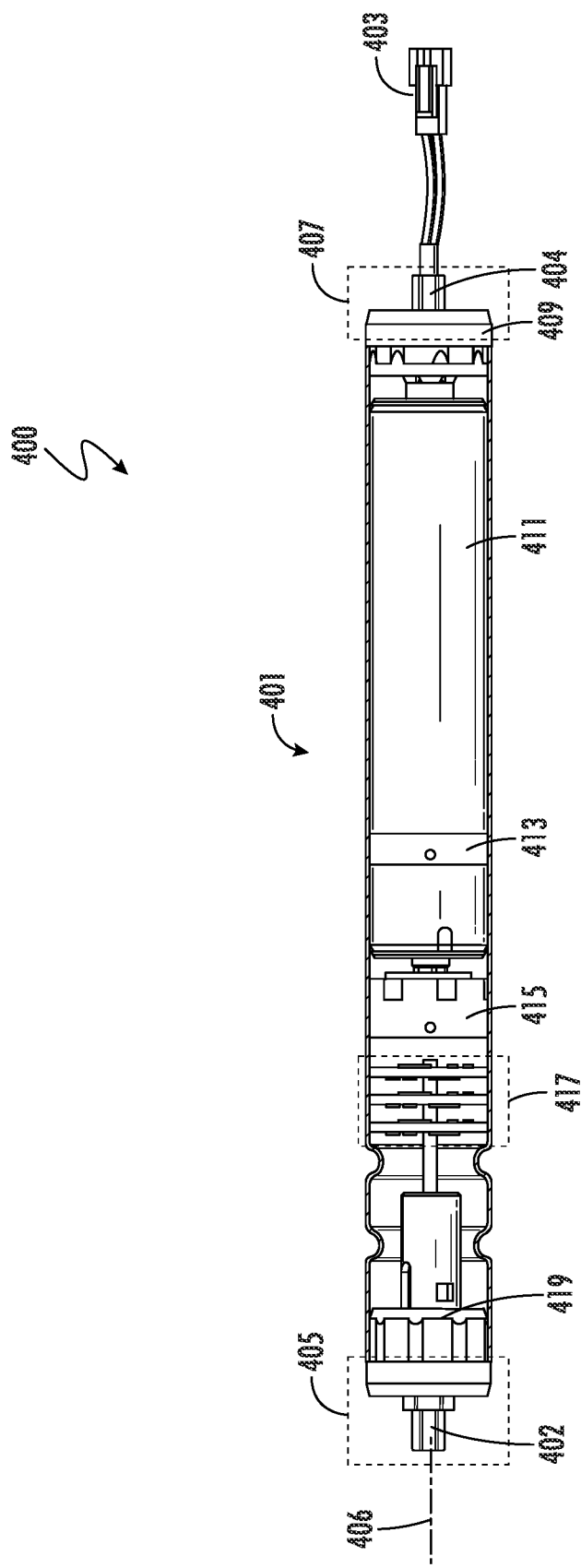
FIG. 4 illustrates a side section view of an example integrated motorized conveyor roller in accordance with various embodiments of the present disclosure.

Referring now to FIG. 4, a schematic diagram depicting a side section view of an example integrated motorized conveyor roller 400 in accordance with various embodiments of the present disclosure is provided. The example integrated motorized conveyor roller 400 can be similar or identical to the integrated motorized conveyor roller 300 discussed above in connection with FIG. 3. The example integrated motorized conveyor roller 400 can be part of a conveyor/conveyor system and can be configured to drive one or more non-motorized conveyor rollers that are operatively coupled thereto. The example integrated motorized conveyor roller 400 can be configured to convey objects along at least a portion of a conveyor line based at least in part on system instructions and/or user interactions via a computing entity (such as the user computing entity 108 described above in connection with FIG. 1). As illustrated in FIG. 4, the example integrated motorized conveyor roller 400 comprises a power cable 403, a first end cap 405, a second end cap 407, a motor assembly 411, a load sensor 413, a drive assembly 415, a controller component 417 and a bearing assembly 419. In various embodiments, the elements/components of the integrated motorized conveyor roller 400 (e.g., the motor assembly 411, the load sensor 413 and the drive assembly 415) are in electronic communication with the controller component 417 such that they can exchange data/information with one another.

As noted above, and as depicted in FIG. 4, the example integrated motorized conveyor roller 400 comprises a housing 401 (e.g., roller tube) configured to contain one or more components/elements of the integrated motorized conveyor roller 300. In particular, as depicted, the example integrated motorized conveyor roller 400 is configured to contain at least the motor assembly 411, the load sensor 413, the drive assembly 415, the controller component 417 and the bearing assembly 419. In various examples, the housing 401 (e.g., roller tube) of the integrated motorized conveyor roller 400 comprises a hollow cylindrical body and can comprise metal, plastic, combinations thereof, and/or the like.

As further illustrated in FIG. 4, the example integrated motorized conveyor roller 400 comprises a first end cap 405 defining a first end/surface of the example integrated motorized conveyor roller 400. As depicted, the first end cap 405 comprises a first appendage 402 configured to be operatively coupled to a conveyor (e.g., disposed between a first rail and a second rail, such as within an aperture of the first rail).

As noted above, and as depicted in FIG. 4, the example integrated motorized conveyor roller 400 can include one or more of a motor assembly 411, a drive assembly 415 and a bearing assembly 419 that operate to drive/rotate the housing 401 (e.g., roller tube) of the integrated motorized conveyor roller 400 with respect to a central axis 406 of the integrated motorized conveyor roller 400. In some embodiments, each of the motor assembly 411 and the drive assembly 415 are at least partially disposed within the housing 401 (e.g., roller tube) of the integrated motorized conveyor roller 400. For example, as shown, at least a surface of the motor assembly 411 and at least a surface of the drive assembly 415 can be in contact with an inner surface of the housing 401 (e.g., roller tube) of the integrated motorized conveyor roller 400. In some embodiments, the housing 401 can include multiple sections. The at least one surface of the motor assembly 411 and the drive assembly 415 can be in contact at least one section (e.g., an inner section), while an outer section may be reconfigured without disrupting the functions of the motor assembly 411 and the drive assembly 415.

The drive assembly 415 can be configured to transfer torque from the motor assembly 411 to the housing 401 (e.g., roller tube) of the integrated motorized conveyor roller. Additionally, as illustrated, the example integrated motorized conveyor roller 400 comprises a bearing assembly 419 configured to, in conjunction with the motor assembly 411 and drive assembly 415, facilitate rotation of the integrated motorized conveyor roller 400 about the central axis 406. As shown, the bearing assembly 419 is disposed adjacent and operatively coupled to the first end cap 405 of the integrated motorized conveyor roller 400. In some embodiments, the drive assembly 415 can be fixed relative to the housing 401 (e.g., roller tube), while the motor assembly 411 is fixed relative to a frame supporting the roller tube, such that the motor assembly 411 can rotate the drive assembly 415 and the roller tube.

As further depicted, the example integrated motorized conveyor roller 400 comprises a second end cap 407 defining a second end/surface of the example integrated motorized conveyor roller 300. As depicted, the second end cap 407 comprises a second appendage 404 configured to be operatively coupled to a conveyor (e.g., disposed between a first rail and a second rail, such as within an aperture of the second rail). As noted above, the integrated motorized conveyor roller 400 comprises a power cable 403 disposed adjacent the second end cap 407 that is configured to be connected to a power supply. In some embodiments, the second end cap 407 comprises a light emitting diode (LED) element 409 that is configured to provide a visual alert in response to a detected condition of the integrated motorized conveyor roller 400.

In some embodiments, as further depicted in FIG. 4, the example integrated motorized conveyor roller 400 comprises a load sensor 413. As shown, the load sensor 413 is disposed within the housing 401 (e.g., roller tube) of the integrated motorized conveyor roller 400 between the motor assembly 411 and the drive assembly 415. The load sensor 413 is configured to determine a weight of an object disposed on at least a portion of the integrated motorized conveyor roller 400, such as by converting a weight of an object into a measurable electrical signal. For example, as an object moves along a conveyor and is incident on the motor assembly 411, the load sensor 413 can generate a measurable electrical signal (e.g., voltage output) corresponding with a weight of the object. In various embodiments, the load sensor 413 can be or comprise one or more strain gauges, piezoelectric sensors and/or the like.

As noted above, and as depicted in FIG. 4, the integrated motorized conveyor roller 400 comprises a controller component 417. As depicted, the controller component 417 can be at least partially disposed within the housing 401 (e.g., roller tube) of the integrated motorized conveyor roller 400. As depicted, the controller component 417 is disposed between the bearing assembly 419 and the drive assembly 415. In various embodiments, the controller component 417 can be or comprise one or more printed circuit boards (PCBs). For example, as depicted, the controller component 417 comprises a PCB stack comprising three PCBs configured to be in electronic communication with one another. In various embodiments, the controller component 417 comprises a controller module that is configured to control operations of the motor assembly 411, drive assembly 415, load sensor 413 and/or the like. In some embodiments, the controller component 417 comprises a wireless module that is configured to provide a communication interface (e.g., Bluetooth, Bluetooth Low Energy (BLE), low-power wide-area network such as Long Range (LoRa), and/or the like) between the integrated motorized conveyor roller 400 and one or more other motorized conveyor rollers. Additionally, in some embodiments, the controller component 417 comprises a power module that is configured to control operations of electronic elements (e.g., circuitry, sensing element and/or the like) of the integrated motorized conveyor roller 400.

While FIG. 4 depicts an example integrated motorized conveyor roller 400, it is noted that the scope of the present disclosure is not limited to the examples shown in FIG. 4. An example integrated motorized conveyor roller 400 in accordance with the present disclosure can comprise one or more additional and/or alternative elements, and/or can be different from that illustrated in FIG. 4. For example, a conveyor roller in accordance with the present disclosure can include adjustable components to controllably divert items at one or more positions along a conveyor line.

FIGS. 5A-C illustrate an example conveyor roller 500 that includes a conveyor roller integrated divert mechanism in accordance with various embodiments of the present disclosure. The conveyor roller 500 can include a motorized or non-motorized conveyor roller. For example, the conveyor roller 500 can be similar to the integrated motorized conveyor rollers 300 and 400 discussed above in connection with FIGS. 3 and 4. For instance, the conveyor roller 500 can be part of a conveyor line/conveyor system. The conveyor roller 500 can be configured to drive one or more non-motorized conveyor rollers that are operatively coupled thereto. In addition, or alternatively, the conveyor roller 500 can be driven by another roller operatively coupled thereto. The conveyor roller 500 can be configured to convey items along at least a portion of a conveyor line based at least in part on system instructions and/or user interactions via a computing entity (such as the user computing entity 108 described above in connection with FIG. 1).

The conveyor roller 500 can include divert assemblies 505 that enable the use of the conveyor roller 500 in both non-diverting and diverting sections of a conveyor line. The divert assemblies 505, for example, can be positioned at one or more locations of the conveyor roller 500 to uniformly divert an item at one or more positions of a conveyor line.

For example, the conveyor roller 500 can include a housing 515. The housing 515 can form an at least partially hollow cylindrical tube. In some embodiments, the housing 515 can include a plurality of radial gaps 510. The plurality of radial gaps 510 can include any number of radial gaps 510. In some embodiments, the number of radial gaps 510 can be determined based on the size (and/or surface area) of the conveyor roller 500 and/or one or more other characteristics of the conveyor roller 500. In one example, the plurality of radial gaps 510 can include three radial gaps evenly separated along the length of the conveyor roller 500. In another example, the plurality of radial gaps 510 can include two radial gaps evenly separated along the length of the conveyor roller 500.

In some embodiments, the conveyor roller 500 can include a plurality of radial gaps 510 positioned in a staggered fashion in relation to adjacent conveyor rollers. For instance, the conveyor roller 500 can have three radial gaps 510 including: (i) a first radial gap at a first portion 520 of the conveyor roller 500, (ii) a second radial gap at a second portion 522 of the conveyor roller 500 that is opposite to the first portion 520, and (iii) a third radial gap at a third portion 521 of the conveyor roller 500 that is between the first portion 520 and the second portion 522. A second, adjacent conveyor roller can have two radial gaps including: (i) a first radial gap at a first portion of the adjacent roller that is between the first portion 520 and the third portion 521 of the conveyor roller 500; and (ii) a second radial gap at a second portion of the adjacent roller that is between the second portion 522 and the third portion 521 of the conveyor roller 500. In this manner, the radial gaps of the conveyor roller 500 can be staggered in relation to adjacent rollers to increase surface contact with items transported by a conveyor line.

Each of the plurality of radial gaps 510 can include a plurality of apertures in the housing 515 through which at least a portion of a divert assemblies 505 can extend and/or retract. For instance, each radial gap 510 can include at least four symmetrical apertures in the exterior of the housing 515 that extend outward from a center point of the housing 515. In this manner, a divert assemblies 505 can extend from the housing 515 from at least four directions. While four apertures are discussed herein, it is noted that a radial gap can include any number (e.g., two, three, five, ten, etc.) of apertures in the housing 515 of the conveyor roller 500. In some embodiments, the number of apertures can be based on the divert assemblies 505.

The divert assemblies 505 can be at least partially disposed within the housing 515 and can extend outside of the housing 515 (e.g., as shown by FIGS. 5B-C) to divert an item. For example, each of the divert assemblies 505 can include a plurality of divert mechanisms. The plurality of divert mechanisms, for example, can include retractable divert mechanisms that are configured to controllably protrude from the housing 515 through at least one of the plurality of radial gaps 510. For instance, each of the divert assemblies 505 can be associated (e.g., position relative to, etc.) with a corresponding radial gap 510. The divert assemblies 505 can include a plurality of divert mechanisms that are each aligned with a respective aperture of a corresponding radial gap 510 such that, when expanded, the divert mechanism protrudes from the housing 515 through the respective aperture to form an exterior, diverting roller.

In some embodiments, each divert mechanism can include a shaft and a diverting head connected to the shaft. The shaft can include a first end that is connected to a portion (e.g., a center shaft) of the conveyor roller 500 and a second end that faces the housing 515 of the conveyor roller 500. The second end can be controllably extended from inside the housing 515 to protrude from the housing 515. The diverting head can be connected to the second end of the shaft and can include a plastic and/or rubber material that may come into contact with an item when expanded from the housing 515 of the conveyor roller 500.

The divert assemblies 505 can be actuated to modify the state of the conveyor roller 500. FIG. 5A illustrates a first state of the conveyor roller 500 in which the divert assemblies 505 are retracted within the housing 515 and not in action. FIG. 5B illustrates a second state, an expanding state 525, in which the divert assemblies 505 are expanding from the housing 515 of the conveyor roller 500. As illustrated by FIG. 5B, during the expanding state 525, the plurality of divert mechanisms 505 of the conveyor roller 500 can protrude from the housing 515. The plurality of divert mechanisms 505 can extend a threshold distance 530 from the housing 515. The threshold distance 530 can include any distance for pushing an item from the surface of the housing 515. For example, in some embodiments, the threshold distance 530 can include a minimum gap between the housing 515 of the conveyor roller 500 and an item transferred by the conveyor roller. The minimum gap can be determined and dynamically adjusted during the setup of the conveyor assembly. In some embodiments, the minimum gap can be based on prospective items (e.g., item types, etc.) that may be scheduled for transport by the conveyor roller.

FIG. 5C illustrates a third state, an active state 550, in which the divert assemblies 505 are positioned to actively divert an item. As illustrated by FIG. 5C, during the active state 550, the plurality of divert mechanisms of the divert assemblies 505 can protrude from the housing 515 at a tilt angle 555. For example, the divert mechanisms can be moveable to protrude from the housing 515 at one or more different tilt angles relative to the housing 515 to form diverting rollers that can cause an item to move along the length of the conveyor roller 500. The tilt angle 555 can include a threshold angle capable of causing a diversion of the item. The threshold angle, for example, can include a 45-degree angle relative to the housing 515.

The tilt angle of the divert mechanisms can be controllable based on a desired diversion for an item. For instance, the one or more different tilt angles can include one or more first tilt angles for diverting an item in a rightward direction with respect to the housing. The first tilt angle can include a rightward angle (e.g., a 135-degree angle, etc.) with respect to the center axis. The rightward angle can include a non-right angle (e.g., an obtuse angle, etc.) with respect to the center axis. In addition, or alternatively, the one or more different tilt angles can include one or more second tilt angles for diverting an item in a leftward direction with respect to the housing. The second tilt angle can include a leftward angle (e.g., a 45-degree angle, etc.) with respect to the center axis. The leftward angle, for example, can include a non-right angle (e.g., an acute angle, etc.) with respect to the center axis. The degree of the leftward angle and the rightward angle can be controllably modified to modify a degree at which an item is diverted from the conveyor roller 500.

Figure 6A:
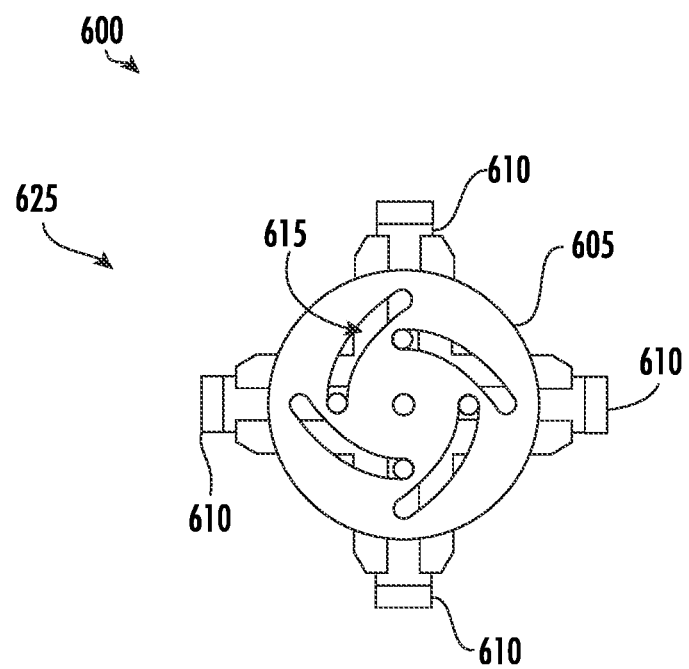
FIGS. 6A-B illustrate example cross-section side views of a divert assembly in accordance with various embodiments of the present disclosure
Figure 6B:
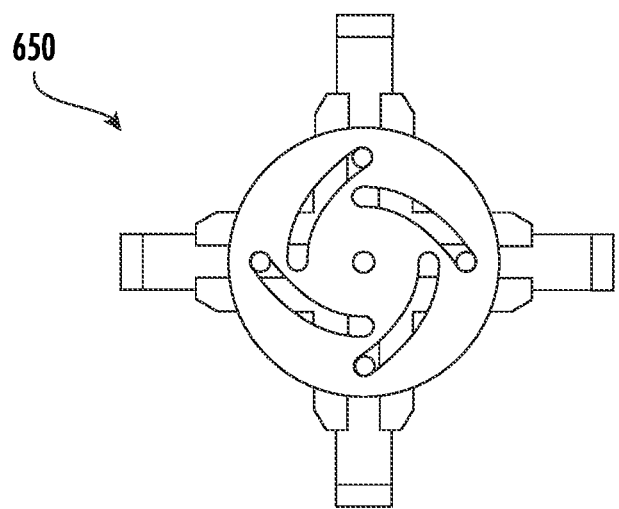

FIGS. 6A-B illustrate example cross-section side views of a divert assembly 600 in accordance with various embodiments of the present disclosure. The divert assembly 600 can include a collapsible mandrel like design which can be controllably collapsed and expanded using a mechanical, or electrical lever, gear, or other mechanism. FIGS. 6A-B depict one example expansion mechanism for illustrative purposes, it is noted that the scope of the present disclosure is not limited to the examples shown in FIGS. 6A-B.

As illustrated, the divert assembly 600 can include an expansion mechanism 605 attached to a retractable divert mechanism 610. When operated, the expansion mechanism 605 can retract and/or expand the retractable divert mechanism 610. For instance, the expansion mechanism 605 can retract the retractable divert mechanism 610 to a retracted state 625 as illustrated by FIG. 6A. In addition, the expansion mechanism 605 can expand the retractable divert mechanism 610 to an expanded state 650 as illustrated by FIG. 6B.

The divert assembly 600 can include an expansion mechanism 610 that is attached to a plurality of retractable divert mechanisms 610. For instance, the plurality of retractable divert mechanisms 610 can include a plurality of retractable shafts that are operatively coupled to the expansion mechanism 610. The expansion mechanism 610 can be operable to expand and retract the retractable divert mechanisms 610 through the at least one radial gap (and/or aperture thereof) of a conveyor housing.

In some embodiments, the expansion mechanism 605 can include a cam slotted gear with a plurality of cam slots. The plurality of cam slots can include a respective cam slot corresponding to each retractable divert mechanism 610. For instance, a retractable shaft can be coupled (e.g., attached, affixed, etc.) a cam slot 615 of the cam slotted gear. The expansion mechanism 605 can be configured to rotate to cause the retractable divert mechanisms 610 (e.g., the retractable shafts thereof) to expand or retract through at least one radial gap (and/or aperture thereof) of the conveyor housing.

In some embodiments, the expansion mechanism 605 can be operatively coupled to an actuator. The actuator can cause the expansion mechanism 605 to rotate automatically. For example, as discussed with reference to FIG. 4, a conveyor roller can include a motor assembly and a drive assembly at least partially disposed within the conveyor housing that are configured to cause rotation of at least a portion of the conveyor roller. In some embodiments, the expansion mechanism 605 is operatively coupled to the motor assembly and the motor assembly is configured to rotate the expansion mechanism 605 to cause the retractable divert mechanisms 610 to expand or retract through the at least one radial gap. Moreover, in some embodiments, the conveyor roller can include a controller component in electronic communication with the motor assembly, the drive assembly, and the divert assembly. The controller component can be configured to cause a rotation of the expansion mechanism 605 responsive to an input.

Figure 7:
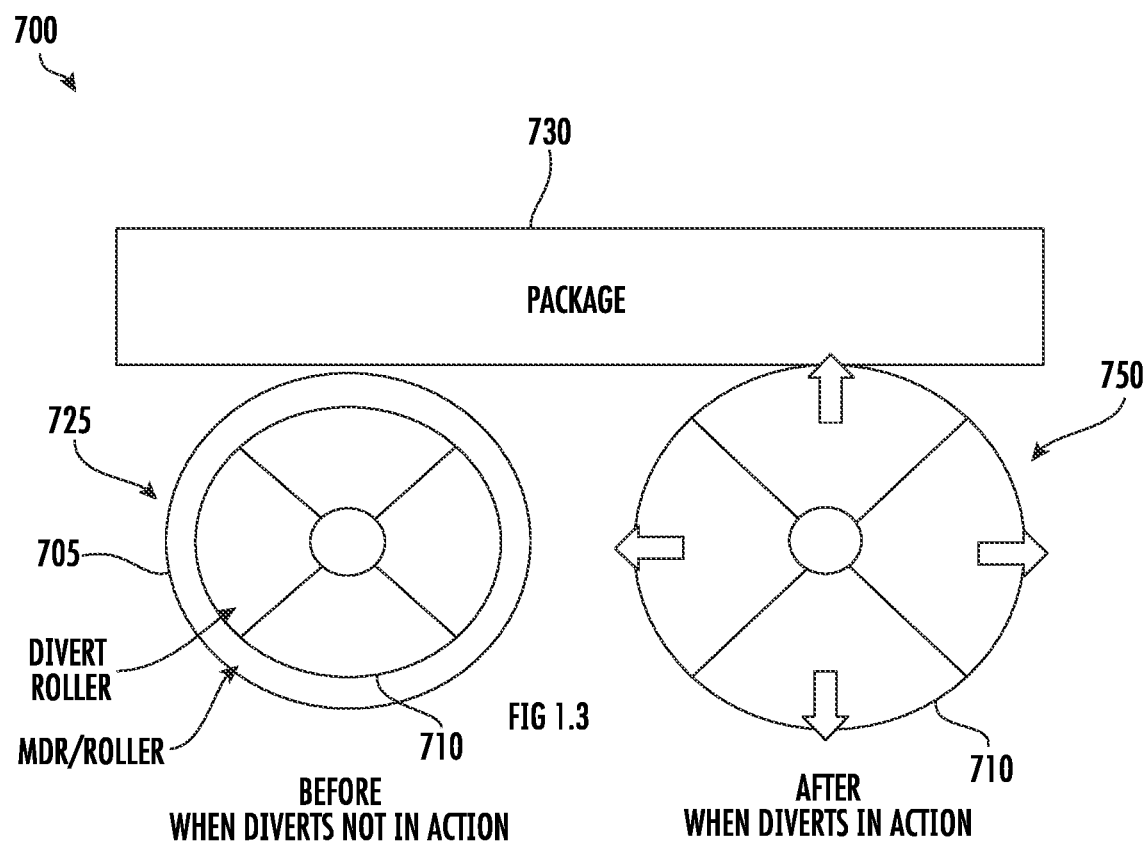
FIG. 7 illustrates an example cross section view of an example conveyor roller in accordance with various embodiments of the present disclosure.

FIG. 7 illustrates an example cross section view of an example conveyor roller 700 in accordance with various embodiments of the present disclosure. The conveyor roller 700 can be collapsed to a first, retracted state 725 and expanded to a second, expanded state 750 via a mechanical and/or electrical lever/gear mechanism such as, for example, the expansion mechanism 605 of FIG. 6.

The conveyor roller 700 can be converted from each state to divert an item 730 at desired angles. For instance, the conveyor roller 700 can include a housing with a first exterior housing surface 705. The first exterior housing surface 705 can be rotated to move the item 730 forward (or backward) along a conveyor line. For instance, in the retracted state 725, the item 730 can make contact with the first exterior housing surface 705 such that the rotation of the first exterior housing surface 705 can apply a rotational force to the item 730 to move the item 730 in the direction of the rotation.

As described herein, the conveyor roller 700 can include a divert assembly at least partially disposed within the first exterior housing surface 705. The divert assembly can include a plurality of retractable divert mechanisms that can form an at least partially cylindrical divert surface 710. When in the retracted state 725, the plurality of retractable divert mechanisms can form a divert surface 710 within the first exterior housing surface 705, such that the divert surface 710 does not make contact with the item 730. When in the expanded state 750, the plurality of retractable divert mechanisms can expand outward from the first exterior housing surface 705 to form a second exterior surface the extends beyond the first exterior surface 705. In the expanded state 750, the item 730 can make contact with the divert surface 710 such that the rotation of the divert surface 710 can apply a force to the item 730 to move the item 730 in a direction of the rotation of the divert surface 710.

As described herein, the divert surface 710 can be formed by the plurality of retractable divert mechanisms. In some embodiments, the retractable divert mechanisms can be positioned at an angle relative to the first exterior housing surface 705. In this manner, the divert surface 710 can be formed by a plurality of exterior diverting rollers such that, when the divert surface 710 comes into contact with the item 730, the rotational force of the divert surface 710 can cause the item 730 to divert in at least one direction from the conveyor roller 700. The conveyor roller 700 can be grouped with a plurality of conveyor rollers with conveyor roller integrated divert assemblies to divert the item 730 at a specific angle (e.g., 45 degrees, etc.)

FIGS. 8A-B illustrate example side section views of an example conveyor roller 800 in accordance with various embodiments of the present disclosure. FIG. 8A illustrates the conveyor roller 800 in a retracted state 825. FIG. 8B illustrates the conveyor roller 800 in an expanded state 850. The conveyor roller 800 can include a motorized or non-motorized conveyor roller. For example, the conveyor roller 800 can be similar to the integrated motorized conveyor rollers 300 and 400 discussed above in connection with FIGS. 3 and 4. For instance, the conveyor roller 800 can be part of a conveyor/conveyor system. The conveyor roller 800 can be configured to drive one or more non-motorized conveyor rollers that are operatively coupled thereto. In addition, or alternatively, the conveyor roller 800 can be driven by another roller operatively coupled thereto. The conveyor roller 800 can be configured to convey items along at least a portion of a conveyor line based at least in part on system instructions and/or user interactions via a computing entity (such as the user computing entity 108 described above in connection with FIG. 1).

The conveyor roller 800 can include divert assemblies 805 that enable the use of the conveyor roller 800 in both non-diverting and diverting sections of a conveyor line. As described herein, the divert assemblies 805, for example, can be positioned at one or more locations of the conveyor roller 800 to uniformly divert an item at one or more positions of a conveyor line.

The conveyor roller 800 can include a housing 815. The housing 815 can form an at least partially hollow cylindrical tube. In addition, the conveyor roller 800 can include a center shaft 810 disposed within the housing 815. The center shaft 810 can extend linearly along a center axis of the housing 810.

A divert assembly 805 can be operably coupled to the center shaft 810. For instance, the divert assemblies 805 can be coupled (e.g., affixed, attached, etc.) to the center shaft 810 by one or more connecting links 820. As described herein, the one or more connecting links 820 can, in some embodiments, be moved to control an angle of the divert assemblies 805. In some embodiments, the divert assemblies 805 (and/or an expansion mechanism thereof) can be operably coupled to the center shaft 810 with a pivot joint such as the ball socket-link mechanism 830. For example, the divert assemblies 805 can be connected to the center shaft 810 with a ball socket-link mechanism 830 that can hold the divert assemblies 805 at a position within housing 815 of the conveyor roller 800 while allowing the divert assemblies 805 to move at an angle relative to the center shaft 810. The ball socket-link mechanism 830 is one example of possible connection mechanisms between a portion of the conveyor roller 800 and the divert assemblies. The connection mechanisms can include any type of pivot joint and/or other means of connection. By way of example, the connection mechanism can include a two-ball assembly, a condyloid joint, hinged joint, serial manipulators, etc.

As illustrated by FIG. 8B, the connecting links 830 can be controlled and/or adjusted to modify an angle of the divert assemblies 805 based on a desired angle of diversion. In some embodiments, the connecting links 830 can be moved by adjusting the positioning of the center shaft 810. For example, center shaft 810 can be adjusted linearly to adjust the position of the connecting links 830. In this manner, the center shaft 810 can be moveable in a lateral direction to adjust an angle of a retractable divert mechanism of the divert assemblies 805. The center shaft 810 can be moved linearly using an actuator (e.g., a magnetic/electrical/mechanical, etc.).

In some embodiments, the divert assembles 805 can include one or more sensor configured to measure the angle of a retractable divert mechanism of the divert assemblies 805. The sensor(s) can include an angle sensor, an inertial measurement sensor, and/or any other sensor capable of generating sensor data indicative of an angle (e.g., relative to the housing 815 or the center shaft 810 of the conveyor roller 800). The sensors can be disposed on and/or proximate to a divert assembly and can be operable to generate sensor data indicative of current angle for the divert assembly. In some embodiments, one or more components of the conveyor roller 800 (e.g., the center shaft 810, connecting links 820, etc.) can be moved based on the current angle for the divert assembly.

The divert assemblies 805 can be configured to rotate with the center shaft 810. For instance, the divert assemblies 805 can include two-ball assembly inside which can receive rotational power from the center shaft 810 when the ball is moved with the center shaft 810. In this manner, the divert assemblies 805 can transfer a rotational force from the center shaft 810 to an item when extended outside of the housing 815. The divert assemblies 805 can be compressed within the housing 815 when diversion of the item is not desired and extended outside of the housing 815 at an angle when diversion of an item is desired.

In some embodiments, the center shaft 810 can be operatively coupled to an actuator. The actuator can cause the center shaft 810 to rotate automatically. For example, as discussed with reference to FIG. 4, the conveyor roller 800 can include a motor assembly and a drive assembly at least partially disposed within the housing 815 that are configured to cause rotation of at least a portion of the conveyor roller 800. In some embodiments, the center shaft 810 is operatively coupled to the motor assembly and the motor assembly is configured to rotate the center shaft 810 to cause the rotation of the housing 815. In some embodiments, the motor assembly can be configured to move the center shaft 810 in a lateral direction to adjust the angle of the divert assemblies 805 (e.g., and/or retractable divert mechanisms thereof).

Moreover, in some embodiments, the conveyor roller 800 can include a controller component in electronic communication with the motor assembly, the drive assembly, and the divert assemblies 805. The controller component can be configured to cause a rotational and/or lateral movement of the center shaft 810 responsive to an input. In some embodiments, the controller component can be configured to receive configuration data or sensor data indicative of a desired or current angle of the retractable divert mechanism and provide instructions to cause the rotational and/or lateral movement of the center shaft 810 in response to the received data.

Figure 9:
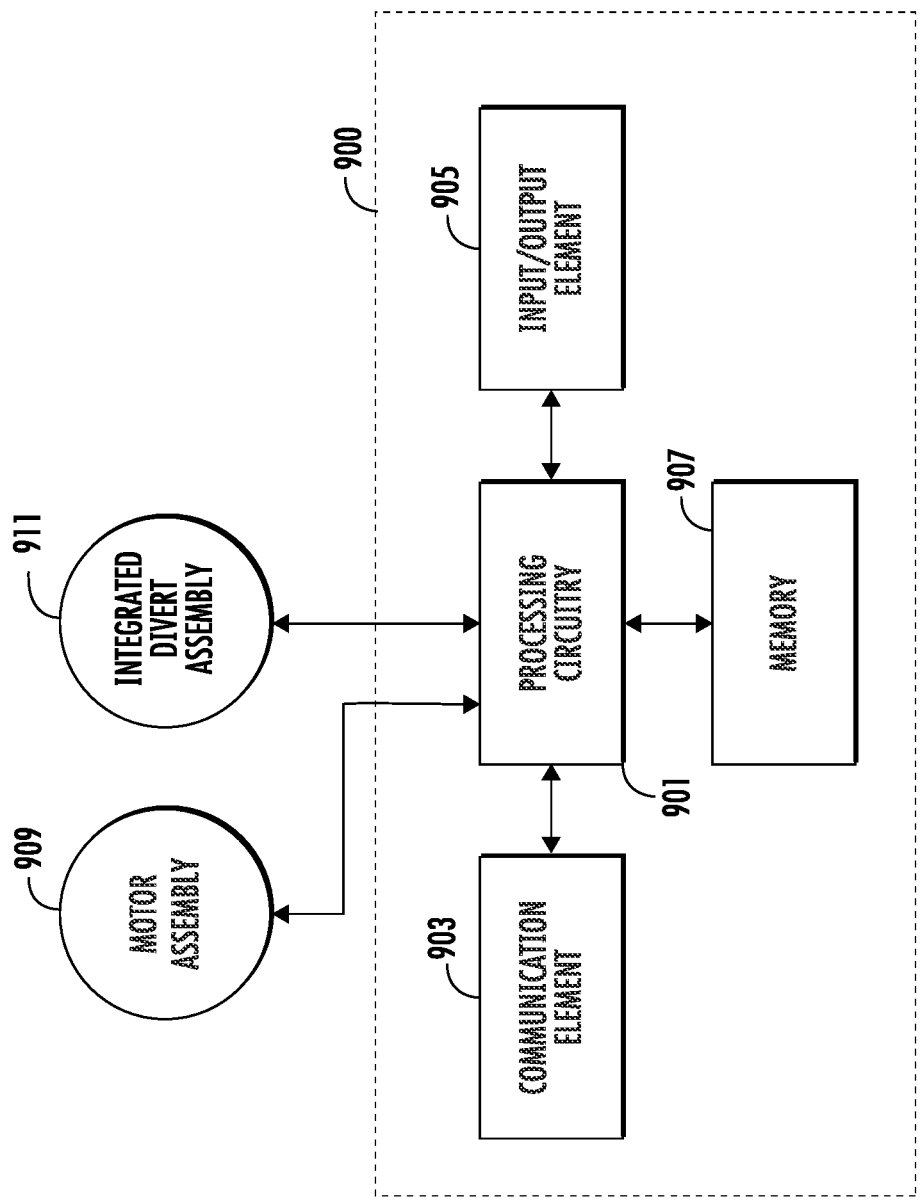
FIG. 9 illustrates an example controller component in electronic communication with various other components of an example integrated motorized conveyor roller in accordance with various embodiments of the present disclosure.
Figure 10:
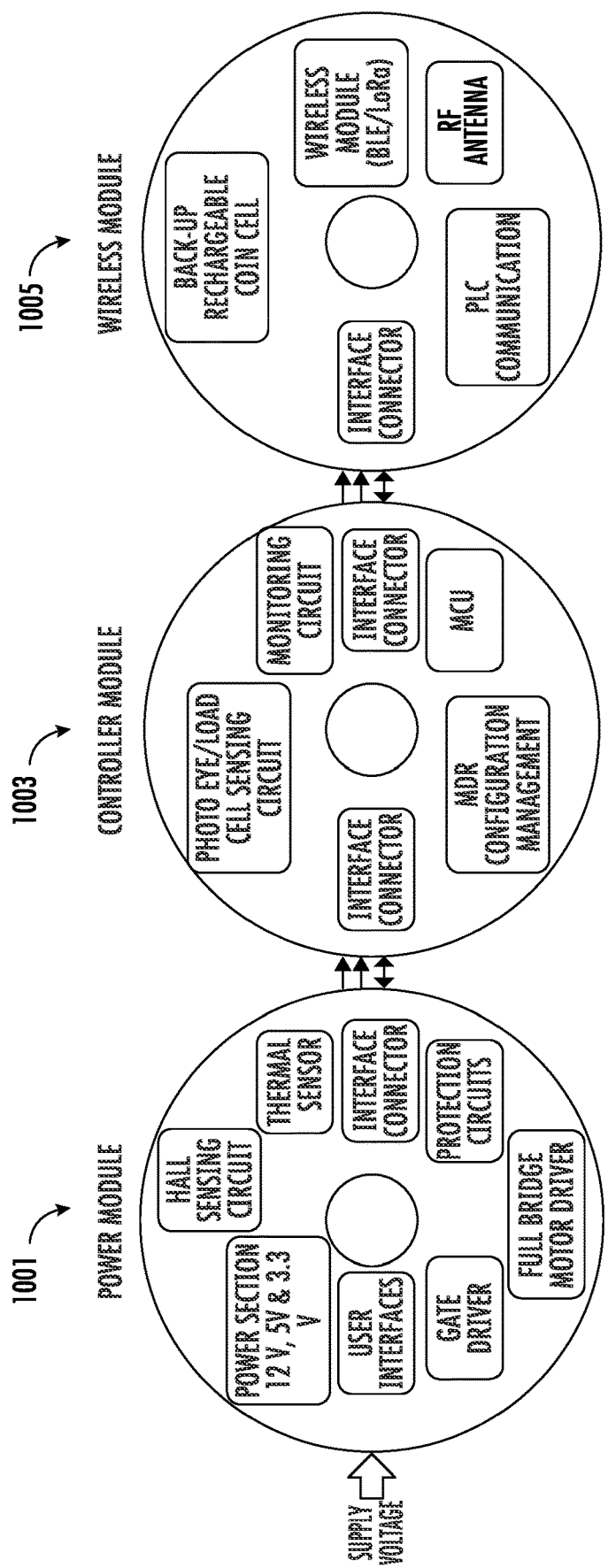
FIG. 10 illustrates an example controller component in accordance with various embodiments of the present disclosure.

Referring now to FIG. 9, a schematic diagram depicting an example controller component 900 in electronic communication with a motor assembly 909 and integrated divert assembly 911 of a conveyor roller in accordance with various embodiments of the present disclosure is provided. As shown, the controller component 900 comprises processing circuitry 901, a communication element 903, input/output element 905, a memory 907 and/or other components configured to perform various operations, procedures, functions or the like described herein.

In some embodiments, the controller component 900 can be or comprise a printed circuit board (PCB). In some examples, the controller component 900 can further comprise one or more of a full bridge motor driver, a hall sensor, one or more thermal sensors, one or more user interfaces, one or more protection circuits, configuration management circuitry, a wireless interface, sensing element circuitry (e.g., image sensor circuitry), an interface connector, power control circuitry, gate driver circuitry and/or the like.

The processing circuitry 901 can be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 9 as a single processor, in an embodiment, the processing circuitry 901 can include a plurality of processors and signal processing modules. The plurality of processors can be embodied on a single electronic device or can be distributed across a plurality of electronic devices collectively configured to function as the circuitry of the conveyor roller. The plurality of processors can be in operative communication with each other and can be collectively configured to perform one or more functionalities of the circuitry of the conveyor roller as described herein. In an example embodiment, the processing circuitry 901 can be configured to execute instructions stored in the memory 907 or otherwise accessible to the processing circuitry 901. These instructions, when executed by the processing circuitry 901, can cause the circuitry of the conveyor roller to perform one or more of the functionalities, as described herein.

Whether configured by hardware, firmware/software methods, or by a combination thereof, the processing circuitry 901 can include an entity capable of performing operations according to embodiments of the present disclosure while configured accordingly. Thus, for example, when the processing circuitry 901 is embodied as an ASIC, FPGA or the like, the processing circuitry 901 can include specifically configured hardware for conducting one or more operations described herein. Additionally, or alternatively, when the processing circuitry 901 is embodied as an executor of instructions, such as can be stored in the memory 907, the instructions can specifically configure the processing circuitry 901 to perform one or more algorithms and operations described herein.

Thus, the processing circuitry 901 used herein can refer to a programmable microprocessor, microcomputer or multiple processor chip or chips that can be configured by software instructions (applications) to perform a variety of functions, including the functions of the various embodiments described above. In some devices, multiple processors can be provided dedicated to wireless communication functions and one processor dedicated to running other applications. Software applications can be stored in the internal memory before they are accessed and loaded into the processors. The processors can include internal memory sufficient to store the application software instructions. In many devices, the internal memory can be a volatile or nonvolatile memory, such as flash memory, or a combination thereof. The memory can also be located internal to another computing resource (e.g., enabling computer readable instructions to be downloaded over the Internet or another wired or wireless connection).

The memory 907 can include suitable logic, circuitry, and/or interfaces that are adapted to store a set of instructions that is executable by the processing circuitry 901 to perform predetermined operations. Additionally, or alternately, the memory 907 can be configured to store data/information, application programs, instructions, and etc., so that the controller component 900 can execute various functions according to the embodiments of the present disclosure. For example, in at least some embodiments, the memory 907 is configured to cache input data for processing by the processing circuitry 901. Thus, in at least some embodiments, the memory 907 is configured to store program instructions for execution by the processing circuitry 901. The memory 907 can store information in the form of static and/or dynamic information. When the functions are executed, the stored information can be stored and/or used by the controller component 900. Example memory embodiments can include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 907 can be integrated with the processing circuitry 901 on a single chip, without departing from the scope of the disclosure.

The communication element 903 can be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 907) and executed by a processing component 900 (for example, the processing circuitry 901). In some embodiments, the communication element 903 (as with other components discussed herein) can be at least partially implemented as the processing circuitry 901 or otherwise controlled by the processing circuitry 901. In this regard, the communication element 903 can communicate with the processing circuitry 901, for example, through a bus. The communication element 903 can comprise, for example, antennas, transmitters, receivers, transceivers, network interface cards and/or supporting hardware and/or firmware/software, and is used for establishing communication with another apparatus. The communication element 903 can be configured to receive and/or transmit any data that can be stored by the memory 907 by using any protocol that can be used for communication between apparatuses. The communication element 903 can additionally or alternatively communicate with the memory 907, the input/output element 905 and/or any other component of the processing component 900, for example, through a bus.

In some embodiments, the processing component 900 can comprise an input/output element 905. The input/output element 905 can communicate with the processing circuitry 901 to receive instructions input by the user and/or to provide audible, visual, mechanical or other outputs to the user. Therefore, the input/output element 905 can comprise supporting devices, such as a keyboard, a mouse, a display, a touch screen display, and/or other input/output mechanisms. Alternatively, at least some aspects of the input/output element 905 can be implemented on a device used by the user to communicate with the processing component 900. The input/output element 905 can communicate with the memory 907, the communication element 903 and/or any other component, for example, through a bus. One or a plurality of input/output modules and/or other components can be included in the processing component 900.

Figure 11:
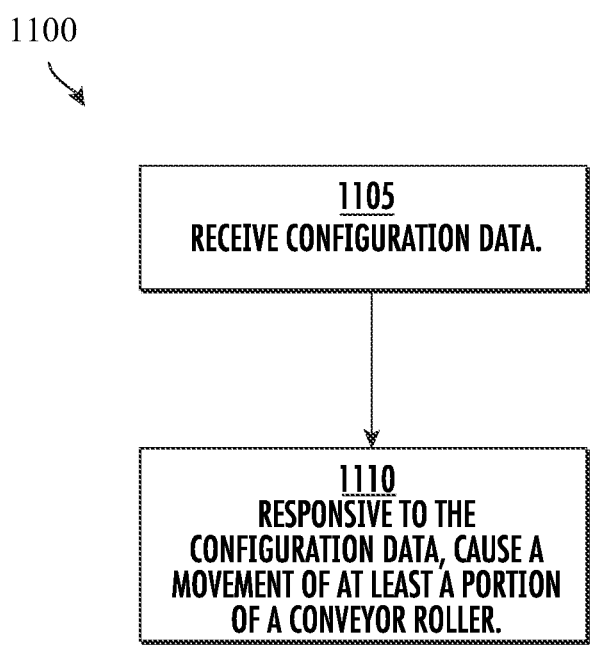
FIG. 11 is a flowchart diagram illustrating example operations in accordance with various embodiments of the present disclosure.

Referring now to FIG. 11, a schematic diagram depicting an example controller component 190 of a conveyor roller in accordance with various embodiments of the present disclosure is provided. In some examples, the controller component 190 can be similar or identical to the controller component 417 described above in connection with FIG. 4.

In some embodiments, as depicted, the controller component 190 can be or comprise a PCB stack comprising a plurality of PCBs in electronic communication with one another via interface connectors. In particular, as depicted, the controller component 190 comprises a power module 191, a controller module 193 and a wireless module 195.

As depicted in FIG. 11, the power module 1101 comprises a first PCB configured to control operations of electronic elements of the conveyor roller. In the depicted embodiment, the power module 1101 is configured to receive/condition a power supply and comprises one or more of a Hall sensing circuit, a thermal sensor, interface connector(s), one or more protection circuits, a full bridge motor driver, a gate driver, one or more user interfaces and a power section.

As noted above, the controller component 1100 comprises a controller module 1103. The controller module 1103 comprises a second PCB that is configured to control various operations of the conveyor roller. In the depicted embodiment, the controller module 1103 comprises at least one sensing element (e.g., photo eye) circuit, interface connector(s), a micro controller unit (MCU) and a conveyor roller configuration management circuit.

As noted above, the controller component 1100 comprises a wireless module 1105. The wireless module 1105 comprises a third PCB that is configured to provide a communication interface (e.g., Bluetooth, BLE, LoRa, and/or the like). For example, between the conveyor roller and one or more other conveyor rollers.

As further depicted in FIG. 11, the wireless module 1105 comprises a power supply (e.g., back-up rechargeable coin cell) a BLE and/or LoRa interface, a communication element, a monitoring circuit and interface connector(s).

In some embodiments, as depicted in FIG. 11, the controller component 1100 can comprise a monitoring circuit for monitoring operations and/or operational conditions of the conveyor roller (e.g., providing self-check functionality) via one or more sensing elements. By way of example, a monitoring circuit of the controller component 1100 can be operatively coupled to a magnetic sensing element (e.g., an inductor or transformer). During operations, the rotation of the conveyor roller motor assembly generates a magnetic field which in turn generates a measurable electrical signal (e.g., voltage output) across the magnetic sensing element coupled thereto. An output of a comparator circuit can be used to provide an output describing one or more parameters associated with conveyor roller (e.g., a lifetime motor operational time, number of rotations, loading conditions, vibrational information, installation issues, belt wear out, and/or the like). In some embodiments, at least a portion of the output of the comparator circuit can be measured and stored in memory. In some examples, the controller component 1100 can provide a control indication to actuate an LED element in response to detecting certain conditions (e.g., complete loss of motor function or overload scenario). In various embodiments, the controller component 1100 can be operatively coupled to other types of sensing elements including pressure sensors, vibrational sensors, temperature sensors, position sensors, and/or the like.

In various embodiments, the controller component 1100 can store (e.g., periodically and/or in response to requests) information/data describing various operational parameters of the conveyor roller including lifetime motor operational time, object information (e.g., information describing presence/absence of an object and/or other characteristics, image data or the like).

While FIG. 11 depicts an example controller component 1100 (e.g., PCB stack), it is noted that the scope of the present disclosure is not limited to the example shown in FIG. 11. An example controller component 1100 in accordance with the present disclosure can comprise one or more additional and/or alternative elements, and/or can be different from that illustrated in FIG. 11. For example, a conveyor roller in accordance with the present disclosure can comprise a single PCB or more than three PCBs.

Referring now to FIG. 11, a flowchart diagram illustrating example operations 1100 in accordance with various embodiments of the present disclosure is provided. In some examples, the example operations 1100 can be performed by various system components (for example, but not limited to, processing circuitry of a computing entity 106 described above with regard to FIG. 1). The system components can be or comprise a central server. In some examples, the system components can include processing circuitry that can be electrically coupled to and/or in electronic communication with other circuitries, such as, but not limited to, one or more conveyor rollers (such as, for example, the integrated motorized conveyor roller 400, the conveyor roller 500, conveyor roller 700, conveyor roller 800, etc. described above in connection with FIGS. 4-5 and 7-8).

At 1105, the operations 1100 can include receiving, by a controller component of a conveyor roller, configuration data. For instance, the controller component can receive the configuration data from a computing entity in electronic communication with the controller component. The configuration data can be indicative of diversion angle for the conveyor roller. The diversion angle can indicate an angle for diverting an item from or to another section of a conveyor line. In some embodiments, the diversion angle can indicate a desire to not divert an item. In other embodiments, the diversion angle can indicate a desire to divert an item and, is some embodiments, an angle for accomplishing the desired diversion.

At 1110, the operations 1100 can include causing, by the controller component and based at least in part on the configuration data, a movement of the conveyor roller responsive to the configuration data. For instance, the controller component can cause a movement of the conveyor roller responsive to the configuration data. The movement can include at least one of: (i) a lateral movement of a center shaft of the conveyor roller, or (ii) a rotation of at least a first portion of a divert assembly of the conveyor roller.

By way of example, the controller component can cause a center shaft can be moved to initiate a change to a diversion angle of the divert assembly. For instance, the configuration data can be indicative of a diversion angle that indicates: (1) a desire to divert or not divert an item from a conveyor line associated with the conveyor roller; and/or (ii) an angle at which to divert or not divert the item. The controller component can initiate a lateral movement of the center shaft (and/or one or more connecting links thereof) of the conveyor roller to adjust the angle of the divert assembly based on the current angle of the divert assembly and the diversion angle.

For example, the controller component can receive sensor data indicative of the current angle of the divert assembly. The sensor data, for example, can be generated by a sensor disposed on, or proximate to the divert assembly. The sensor can include an angle sensor, an inertial measurement sensor, and/or any other sensor capable of generating sensor data indicative of an angle (e.g., relative to a housing or center shaft of the conveyor roller). The controller component can determine the current angle for the divert assembly based on the sensor data.

The controller component can determine a lateral movement for the center shaft (and/or one or more connecting links thereof) based on the current angle of the divert assembly and the diversion angle. In some embodiments, the control component can continuously determine the current angle for the divert assembly and cause a movement the center shaft and/or divert assembly until the current angle achieves the diversion angle.

As another example, the controller component can cause rotation of at least a portion of the divert assembly to initiate a change to the activation state of the divert assembly. For instance, the divert assembly can be configure in one or more states including: (i) a retracted state in which the divert assembly is fully (or substantially) retracted within the housing of the conveyor roller and does not come into contact with an item and (ii) an expanded state in which the divert assembly at least partially protrudes from the housing of the conveyor and comes into contact with the item.

In some embodiments, the divert assembly can be modified from a retracted state to an expanded state by actuating an expansion mechanism of the divert assembly. The expansion mechanism, for example, can include a mechanical and/or electrical gear, level, etc. that can be actuated to cause a retractable divert mechanism of the divert assembly to expand or retract from/within the housing of the conveyor roller. In some embodiments, the expansion mechanism can include a cam slotted gear that can be rotated to cause an expansion and/or retraction of the retractable divert mechanism. In this manner, a rotation of at least the first portion (e.g., an expansion mechanism) of the divert assembly can cause a second portion (e.g., a retractable divert mechanism) of the divert assembly to expand through an exterior housing of the conveyor roller.

The controller component can determine a state for the divert mechanism based on the configuration data. For instance, the controller component can determine a retracted state for the divert mechanism in the event that the configuration data is indicative of a desire to not divert an item. In addition, or alternatively, the controller component can determine an expanded state for the divert mechanism in the event that the configuration data is indicative of a desire to divert an item. The controller component can initiate a movement (e.g., a rotation, etc.) of the expansion mechanism of the divert assembly to transition the divert assembly to a desired state based on the configuration data.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A conveyor roller comprising:
   a housing forming an at least partially hollow cylindrical tube, wherein the housing comprises a plurality of radial gaps;
   a divert assembly at least partially disposed within the housing and operable to divert an item, wherein the divert assembly comprises a retractable divert mechanism forming a divert surface configured to controllably protrude from the housing through at least one of the plurality of radial gaps.

2. The conveyor roller of claim 1, wherein the divert assembly further comprises an expansion mechanism attached to the retractable divert mechanism, wherein the divert surface is configured to protrude from the housing at one or more different angles relative to the housing, wherein the one or more different angles comprise at least: (i) a first angle for diverting an time in a rightward direction with respect to the housing and (ii) a second angle for diverting the item in a leftward direction with respect to the housing.

3. The conveyor roller of claim 2, wherein an angle of the retractable divert mechanism is controllable based on a desired divert angle for the item.

4. The conveyor roller of claim 3, wherein the expansion mechanism comprises a cam slotted gear.

5. The conveyor roller of claim 4, wherein the retractable divert mechanism is attached to a cam slot of the cam slotted gear.

6. The conveyor roller of claim 1, wherein the divert assembly further comprises an expansion mechanism attached to the retractable divert mechanism, the expansion mechanism operable to expand and retract the divert surface of the retractable divert mechanism through the at least one of the plurality of radial gaps.

7. The conveyor roller of claim 6, wherein the expansion mechanism is configured to rotate to cause the retractable divert mechanism to expand or retract through the at least one of the plurality of radial gaps.

8. The conveyor roller of claim 6, further comprising:
   a motor assembly and a drive assembly at least partially disposed within the housing that are configured to cause rotation of at least a portion of the conveyor roller, wherein the expansion mechanism is operatively coupled to the motor assembly, and wherein the motor assembly is configured to rotate the expansion mechanism to cause the retractable divert mechanism to expand or retract through the at least one of the plurality of radial gaps.

9. The conveyor roller of claim 8, further comprising:
   a controller component in electronic communication with the motor assembly, the drive assembly, and the divert assembly, wherein the controller component is configured to cause a rotation the expansion mechanism responsive to an input.

10. The conveyor roller of claim 1, further comprising:
    a center shaft disposed within the housing, wherein the center shaft extends linearly along a center axis of the housing.

11. The conveyor roller of claim 10, wherein the divert assembly is operably coupled to the center shaft.

12. The conveyor roller of claim 11, wherein the divert assembly is configured to rotate with the center shaft, and wherein the center shaft is moveable in a lateral direction to adjust an angle of the retractable divert mechanism.

13. The conveyor roller of claim 12, further comprising:
    a motor assembly and a drive assembly at least partially disposed within the housing that are configured to cause rotation of at least a portion of the conveyor roller, wherein the center shaft is operatively coupled to the motor assembly, and wherein the motor assembly is configured to rotate the center shaft to cause a rotation of the housing.

14. The conveyor roller of claim 13, wherein the motor assembly is configured to move the center shaft in the lateral direction to adjust the angle of the retractable divert mechanism.

15. The conveyor roller of claim 14, further comprising:
    a controller component in electronic communication with the motor assembly, the drive assembly, and the divert assembly, wherein the controller component is configured to cause a lateral movement of the center shaft responsive to an input.

16. The conveyor roller of claim 15, wherein the divert assembly comprises a sensor configured to measure the angle of the retractable divert mechanism, and wherein the controller component is configured to receive configuration data from the divert assembly indicative of the angle of the retractable divert mechanism.

17. The conveyor roller of claim 10, wherein the divert assembly is operably coupled to the center shaft by a pivot joint.

18. A method comprising:
    receiving, by a controller component of a conveyor roller, configuration data from a computing entity in electronic communication with the controller component, the configuration data indicative of diversion angle for the conveyor roller; and
    causing, by the controller component and based at least in part on the configuration data, a movement of the conveyor roller responsive to the configuration data, wherein the movement comprises at least one of: (i) a lateral movement of a center shaft of the conveyor roller, or (ii) a rotation of at least a first portion of a divert assembly of the conveyor roller.

19. The method of claim 18, wherein the diversion angle indicates an angle to divert an item from a conveyor line associated with the conveyor roller, and wherein the movement comprises a lateral movement of the center shaft of the conveyor roller to adjust an angle of the divert assembly.

20. The method of claim 19, wherein the rotation of at least the first portion of the divert assembly causes a second portion of the divert assembly to expand through an exterior housing of the conveyor roller.

* * * * *